(12) United States Patent
Clevorn et al.

(10) Patent No.: US 8,781,424 B2
(45) Date of Patent: Jul. 15, 2014

(54) RADIO RECEIVER APPARATUS OF A CELLULAR RADIO NETWORK

(75) Inventors: Thorsten Clevorn, München (DE);
Herbert Dawid, Herzogenrath (DE);
Edgar Bolinth, Korschenbroich (DE);
Markus Jordan, Gelsenkirchen (DE);
Rajarajan Balraj, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 2 days.

(21) Appl. No.: 13/405,989

(22) Filed: Feb. 27, 2012

(65) Prior Publication Data
US 2013/0225106 A1 Aug. 29, 2013

(51) Int. Cl.
*H04B 17/00* (2006.01)
(52) U.S. Cl.
USPC .................. 455/226.2; 455/67.11; 455/67.14; 455/68; 455/137; 455/436; 375/267; 375/148; 375/144

(58) Field of Classification Search
USPC .............. 455/226.1–226.3, 67.11, 67.14, 68, 455/137, 138, 436; 375/267, 148, 144
See application file for complete search history.

(56) References Cited

U.S. PATENT DOCUMENTS

| | | | |
|---|---|---|---|
| 6,434,366 B1 * | 8/2002 | Harrison et al. | 455/69 |
| 2005/0025110 A1 | 2/2005 | Becker et al. | |
| 2007/0072552 A1 * | 3/2007 | Jonsson et al. | 455/67.11 |
| 2010/0067563 A1 * | 3/2010 | Wang et al. | 375/144 |

* cited by examiner

*Primary Examiner* — Junpeng Chen
(74) *Attorney, Agent, or Firm* — Eschweiler & Associates, LLC

(57) ABSTRACT

A radio receiver apparatus of a cellular network includes a channel estimator configured to calculate channel estimates on the basis of a common pilot channel. The apparatus further includes a weight calculation unit configured to calculate a weighting factor on the basis of a signal power of the common pilot channel and control data depending on a transmit signal power of a dedicated data channel. The control data is signaled by the cellular network to the radio receiver apparatus. The radio receiver apparatus further comprises a combiner that combines the signals from multiple cells by using the channel estimates and the weighting factor.

14 Claims, 5 Drawing Sheets

RADIO RECEIVER APPARATUS OF A CELLULAR RADIO NETWORK

FIELD

The invention relates to cellular radio communications systems, and more particularly to the technique of combining signals from multiple diversity branches in a radio receiver apparatus.

BACKGROUND

Combining is used in a radio receiver apparatus when receiving a signal over multiple propagation paths and/or from multiple receive antennas. It is desirable to provide for a high receiver performance in the presence of one or more cells of the cellular radio network.

BRIEF DESCRIPTION OF THE DRAWINGS

Aspects of the invention are made more evident by way of example in the following detailed description of embodiments when read in conjunction with the attached drawing figures, wherein.

DETAILED DESCRIPTION

Figure 1:
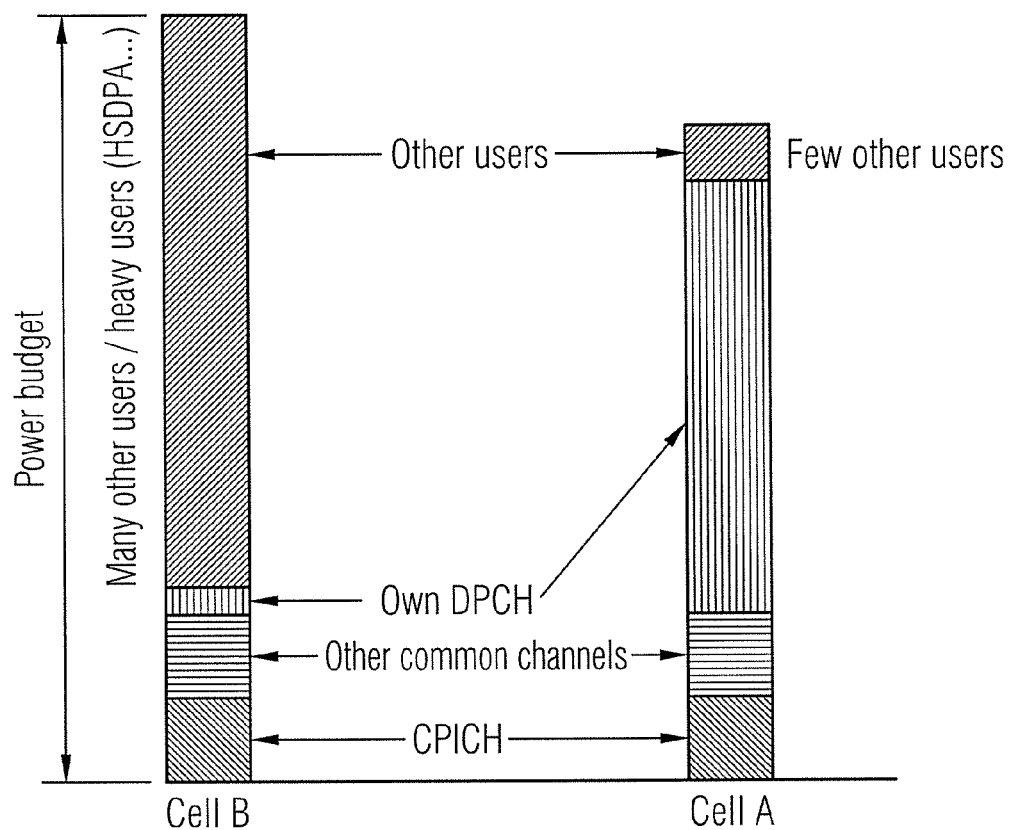
FIG. 1 is a schematic diagram depicting an example for dedicated channel power allocation to a radio receiver apparatus in two cells.

In the following detailed description, reference is made to the accompanying drawings, which form a part thereof, and in which is shown by way of illustration embodiments in which the invention may be practiced. It is to be understood that other embodiments may be utilized and structural or logical changes may be made without departing from the scope of the present disclosure. The following detailed description, therefore, is not to be taken in a limiting sense, and the scope of the present invention is defined by the appended claims.

It is to be understood that the features of the various exemplary embodiments described herein may be combined with each other, unless specifically noted otherwise. Further, like reference numerals designate corresponding similar parts.

As employed in this specification, the terms "coupled" and/or "connected" are not meant to mean in general that the elements must be directly coupled or connected together; intervening elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

It should be understood that embodiments may be implemented in discrete circuits, partially integrated circuits or fully integrated circuits. Further, embodiments of the invention may be implemented on a single semiconductor chip or on multiple semiconductor chips connected to each other.

Furthermore, it should be understood that embodiments of the invention may be implemented in software or in dedicated hardware or partially in software and partially in dedicated hardware.

The following description relates to radio receiver apparatus operating in a cellular network configured to support soft handover. In soft handover, the radio receiver apparatus always has a radio connection to one or more cells. By way of example, UMTS (Universal Mobile Telecommunications System) networks and other kinds of CDMA (Code Division Multiple Access) cellular radio networks may support soft handover. Further, some multi-carrier modulation systems such as, e.g., OFDM (Orthogonal Frequency Division Multiplexing) radio communications systems including systems as stipulated in the LTE (Long Term Evolution) standard may employ soft handover. By way of example, LTE Rel11 employs some kind of soft handover.

A mobile receiver apparatus as described herein may form a part of a mobile station of a wireless network. In the following the terms mobile station and user equipment (UE) shall have the same meaning, which meaning shall comprise the definitions given in the various standards (e.g. UMTS, LTE and derivatives thereof). In the following the term UE is used. By way of example, a UE may be represented by a cellular phone, a smartphone, a tablet PC, a laptop, etc.

In a wireless network for mobile UEs with numerous cells, the network and the UE have a mechanism to decide to which cell the UE is to be connected. When the UE is moving, a decision has to be made when to handover the UE to the next cell(s). In a soft handover wireless network, where the UE may be connected to several cells at the same time (in case of UMTS e.g. up to six cells), the UE has an "active set" of cells to which it is connected and a "monitored set" of cells which are monitored, but to which it is not connected. Active set updating, as initiated by the handover decision, may comprise various procedures such as, e.g., adding a new cell to the active set, removing a cell from the active set, replacing a cell of the active set by a cell of the monitored set (e.g., if the active set is full) and changing the best cell of the active set.

As known in the art, one base station may establish one or several (different) cells. Multiple cells of one base station may, e.g., be established by multiple antenna sectors at one base station, with each antenna sector defining one cell. Signals from different cells can be distinguished at the UE, e.g., by way of a cell-specific scrambling code. Base stations are also referred to as NodeB or eNodeB in the art.

In the UE, signals of multiple diversity branches are combined. Various techniques are known to combine signals from multiple diversity branches. Basically, combining schemes improve with additional combined branches. A combiner used for combining in the UE superimposes signals from the multiple diversity branches associated with the same information (e.g., signals from different cells and/or signals that are transmitted over different propagation paths and/or signals received at different receive antennas, etc.)

In combining, each signal from a diversity branch is weighted on the basis of a specific diversity branch weight and the weighted signals are added up. Various aspects may be taken into account for calculation of the diversity branch weights. Channel estimates may be used to combine signals received over different propagation paths in order to consider the channel characteristics of the different physical transmission channels over which the signals are transmitted. By way of example, a channel estimator may calculate channel estimates on the basis of a common pilot channel (that is to say a pilot channel that is available to all UEs). One channel that is suitable for this purpose in UMTS is the CPICH (Common Pilot CHannel), e.g. the P-CPICH (Primary CPICH). Computations of channel weights on the basis of a common pilot channel have typically good statistics. On the other hand, dedicated data channels such as, e.g., the DPCH (Dedicated Physical CHannel) of UMTS typically contain less (dedicated) pilot symbols than the common pilot channels or even no (dedicated) pilot symbols. Therefore, in many cases, a common pilot channel is used to derive channel estimates which are then used for combining signals or signal components of a dedicated data channel.

In MRC (Maximum Ratio Combining) the branch weights are chosen to take account of the SNR (Signal-to-Noise Ratio) of the signals from the multiple diversity branches. If branch weight calculation is performed on the common pilot channel, only the SNR of the common pilot channel is considered in the combining process. This would result in the SNR of the dedicated data channel (e.g., DPCH) being ignored in the combining process.

By way of example, if the UE is connected to two different cells, the signals of the dedicated data channel are transmitted by both cells and the SNR of the dedicated data channel is given by the combination of these two links. The dedicated data channel may be power controlled, i.e., the UE may request just sufficient power for successful reception to limit the downlink interference.

Each base station or cell may have a certain power budget it has to split into the common channels, such as, e.g., the CPICH, and the dedicated channels to the UEs. Thus, depending on the load of the cells, e.g., the number of UEs connected to a cell, the transmit power allocated to a dedicated data channel signal for a specific UE might significantly differ between the cells participating in the active set.

FIG. 1 illustrates a schematic diagram depicting an example for dedicated channel power allocation to an UE. Without loss of generality, FIG. 1 uses by way of example UMTS channels. The power budget of each cell, namely cell A and cell B, is exemplified. The UE under consideration may be connected to both cells, i.e. cell A and cell B may both be cells of the active set of the UE. Further cells that are not depicted in FIG. 1 may also participate in the active set.

The common pilot channel (e.g., CPICH) of cell A and cell B may be transmitted with the same power. Therefore, the UE under consideration may see the CPICH from both cells A and B with equal strength (e.g., identical SNR). However, the transmit power of the dedicated data channel ("Own DPCH" in FIG. 1) may be controlled independently of the transmit power of the common pilot channel (CPICH in FIG. 1) in order to cope with varying load conditions in each cell.

More specifically, cell B may, e.g., have a lot of users, and therefore the power budget of this cell B may be at its limit. Therefore, as a high number of users have to be served by cell B, the dedicated data channel (e.g. DPCH) of the UE under consideration may get only a small portion of transmit power from cell B. This is depicted on the left side portion as "Own DPCH" in FIG. 1. On the other hand, cell A may, e.g., have only few other users. In that case, cell A may provide much more transmit power to the dedicated data channel ("Own DPCH") than cell B. By way of example, the power budget of cell A may not be at its limit and could even increase the transmit power allocated to the dedicated data channel (e.g., DPCH).

Different cells are subject to fading and attenuation. Fading and attenuation may be expressed by the SNR of the common pilot channel (e.g. CPICH). However, the SNR of the dedicated data channel (e.g. DPCH) for each cell of the active set might significantly differ at the UE due to cell-specific transmit power regulation of the dedicated data channel. This may not be expressed by the SNR of the common pilot channel as seen at the UE.

In some network implementations, transmit power regulation of the dedicated data channel (e.g., DPCH) may individually and separately be performed in each cell. In other network implementations, transmit power regulation of the dedicated data channel may be commonly performed for a group of cells. By way of example, cells associated with one base station, such as, e.g., cells that are established by multiple antenna sectors of one base station, may have a common transmit power control.

Transmit power control data of a cell may be signaled by the cellular network to the UE. A combiner in the UE, which combines signals from multiple cells, may then use a weighting factor which is calculated on the basis of a signal power of the common pilot channel and the transmit power control data received from the cellular network at the UE.

The combiner in the UE combines signals from multiple diversity branches established by at least two cells A and B. According to the example illustrated in FIG. 2, cell A and cell B may transmit signals of one dedicated data channel, e.g., DPCH, to an UE under consideration. Signals transmitted by cell A may be distinguished from signals transmitted by cell B in the UE. By way of example, signals transmitted by cell A may be scrambled with a scrambling code that is different from the scrambling code used in cell B.

As already mentioned, cell A and cell B may be formed by different base stations located at remote sites. According to another possibility, cell A and cell B may be established by two different antenna sectors located at the same base station.

The transmission signal of all physical channels of cell A may reach the UE via a number of different propagation paths, e.g., a propagation path along a line of sight and a propagation path along a line of reflection. The combiner in the UE may add these signals or signal components that reach the UE via different propagation paths in weighted and synchronized form. Such filtering and weighting may be performed by a matched filter receiver. One particular matched filter receiver is, e.g., the RAKE receiver for detecting CDMA signals. For this purpose the RAKE receiver has a number of "fingers". The outputs of the fingers may be connected to the combiner. During operation, each finger is associated with one propagation path and carries out the path-specific demodulation (e.g., delay compensation, descrambling, despreading, symbol formation). The combiner may superimpose those signals or signal components that are transmitted via different propagation paths and are associated with the same dedicated data channel, e.g. DPCH. Thus, in the example shown in FIG. 2, signals of diversity branches DB1 (cell A—line of sight propagation path), DB2 (cell A—reflection line propagation path), DB3 (cell B—line of sight propagation path), and DB4 (cell B—reflection line propagation path) may be combined by the combiner in the UE. Combining signals from multiple diversity branches DB1-DB4 established by different propagation paths within each cell is often used in wireless communication networks which are subject to ISI (Inter Symbol Interference), such as, e.g., CDMA systems.

Figure 3:
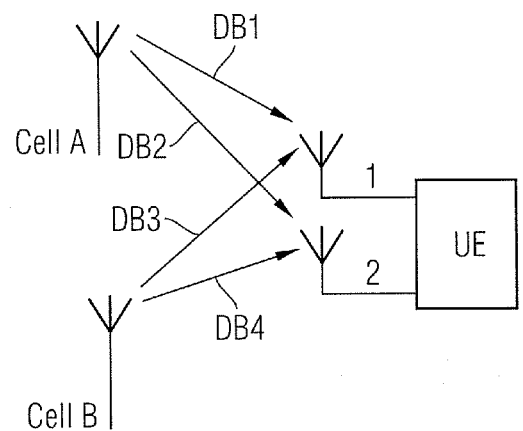
FIG. 3 is a schematic diagram illustrating diversity by multiple receive antennas in a multiple cell network.

According to FIG. 3, multiple diversity branches in two cells A and B may also be established by a plurality of receive antennas at the UE. By way of example, multiple receive antennas are used in MIMO (Multiple Input Multiple Output) systems. Again, the signals received at the UE from cell A and cell B may be distinguished in the UE, e.g., by way of demodulating a code such as, e.g., an individual scrambling code used in each of the cells A, B. In FIG. 3, by way of example, a single tap channel showing no ISI is considered. That is, per each antenna, no delayed signal components travelling over one or more reflection line propagation paths are used in the combining process. Here, signals from the diversity branches DB1 (cell A—antenna 1), DB2 (cell A—antenna 2), DB3 (cell B—antenna 1), and DB4 (cell B—antenna 2) are combined. Signal combining according to FIG. 3 is often used in OFDM systems such as, e.g., LTE.

Figure 4:
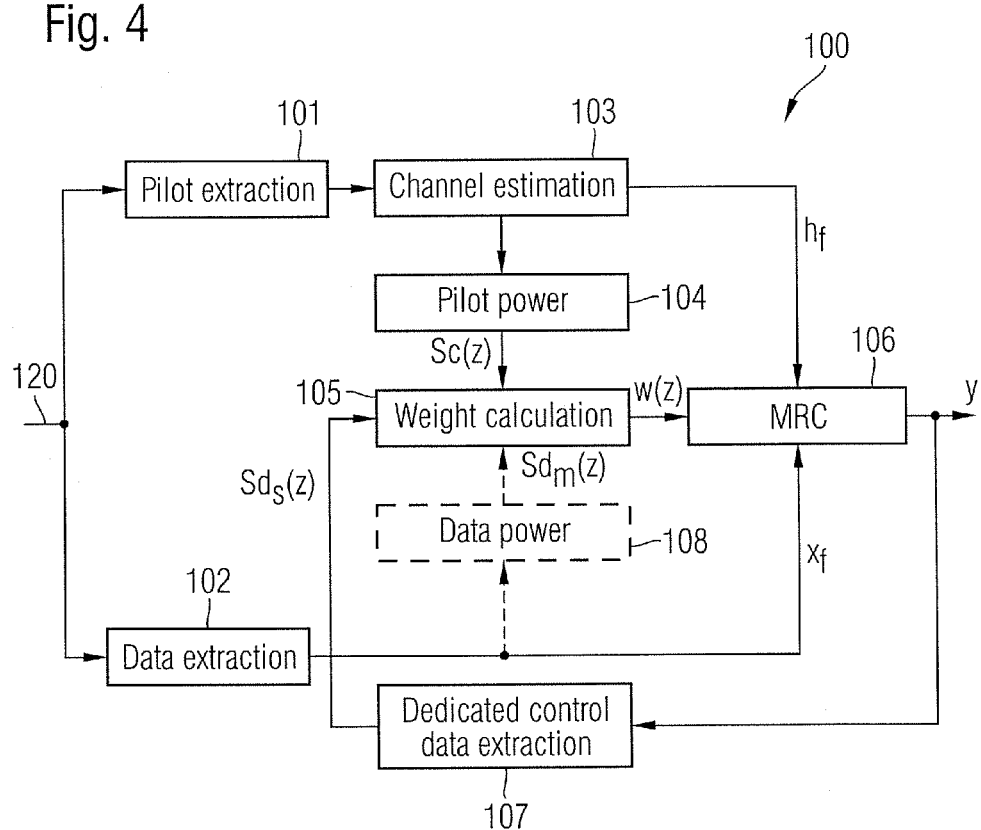
FIG. 4 is a schematic block diagram of an exemplary implementation of a radio receiver apparatus.

According to FIG. 4, an exemplary UE 100 may comprise a pilot extraction unit 101, a data extraction unit 102, a channel estimation unit 103, a pilot power computation unit 104, a weight calculation unit 105, a combiner 106, e.g. a MRC, and a dedicated control data extraction unit 107. The block diagram of UE 100 may be applicable to all receiver types, e.g., RAKE receiver, MIMO receiver, OFDM receiver, e.g., for LTE, etc.

Input 120 of UE 100 may be connected to one or a plurality of receive antennas (not shown) and an RF (Radio Frequency) stage (not shown) connected between the receive antenna(s) and the input 120. An antenna signal received at the antenna(s) may be filtered and down-converted in the RF stage and is typically analog-to-digital converted into digital samples at input 120. The sequence of samples received at input 120 is processed in the pilot extraction unit 101 and the data extraction unit 102. In pilot extraction unit 101, pilots such as, e.g., the common pilot symbols transmitted via the P-CPICH are extracted from the input sample sequence. Each pilot extracted by the pilot extraction unit 101 may be associated with one diversity branch, i.e., with one cell and one propagation path and/or one receive antenna. Descrambling may be used for cell identification, signal delay profile analysis as accomplished by a searcher may be used for propagation path identification and the receive antenna from which the pilot is received is known by receive antenna connectivity.

The channel estimation unit 103 computes channel estimates on the basis of the common pilots. Any method for channel estimation may be used. Channel estimates are denoted by $h_f$, where f is an index of the diversity branches that are processed in the UE 100.

By way of example, if the UE 100 is a RAKE receiver, f may be the RAKE finger index. In operation each RAKE finger may be associated with a specific cell and a specific propagation path (i.e., signal delay), see, e.g., the illustration in FIG. 2. In other implementations, f may be an index of the cell and of the receive antenna, see, e.g., FIG. 3. Further, f may be an index identifying the cell, the propagation path and the receive antenna and/or, optionally, other diversity branches.

In the pilot power unit 104 the power of the common pilot channel, e.g., the CPICH power, may be computed. The power of the common pilot channel is computed individually for each cell. In the following the cell-specific signal power of the common pilot channel is denoted by Sc(z), where z is the cell index. It is to be noted that various other methods may be used to compute the cell-specific signal power Sc(z). By way of example, the cell-specific signal power Sc(z) may be computed directly from the output of the pilot extraction unit 101, i.e., not on the basis of the channel estimates $h_f$.

Data samples of the dedicated data channel, e.g. DPCH, are extracted in data extraction unit 102. By way of example, the data samples may correspond to data symbols of the dedicated data channel. Each data sample extracted by data extraction unit 102 is dedicated to the specific UE 100 under consideration and associated with a specific cell, e.g., a specific propagation path and/or a specific receive antenna. Data sample extraction may be accomplished, for example, by descrambling (e.g., for cell identification), by despreading (for identification of the designated UE 100), by applying an appropriate signal delay (for setting the receiver to a specific propagation path) and by knowledge of the receive antenna connectivity in case of multiple receive antennas.

The channel estimates $h_f$ computed in channel estimation unit 103 and the data samples extracted in data extraction unit 102 are input to the combiner 106, e.g. a MRC. The combiner 106 further receives at another input a cell-specific weighting factor w(z) output from weight calculation unit 105.

Figure 2:
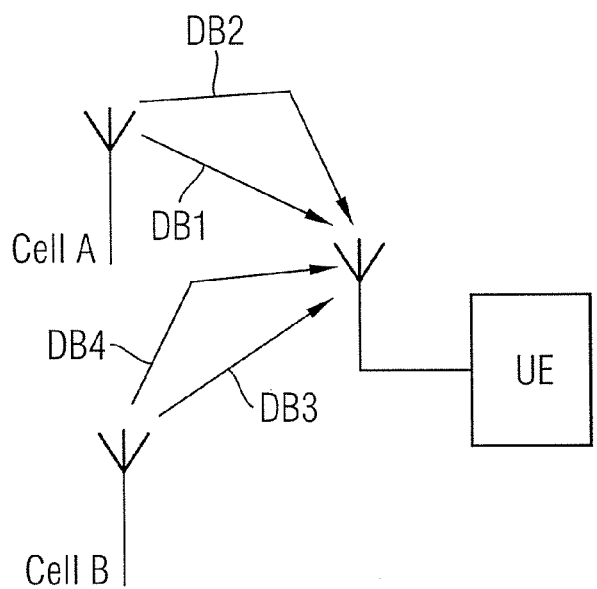
FIG. 2 is a schematic diagram illustrating diversity by multiple propagation paths in a multiple cell network.

The combiner output y over all diversity branches DB may be written as $$y = \sum_{f \in DB} w_f \, x_f h_f, \qquad (1)$$

where $x_f$ is a data sample from data extraction unit 102 associated with diversity branch f and $w_f$ is the weighting factor $w(z_f)$ of that specific cell $z_f$ with which the diversity branch of index f is associated (e.g., in FIGS. 2 and 3, $z_f$=cell A for f=DB1 or DB2 and $z_f$=cell B for f=DB3 or DB4). By way of example, assuming an UMTS cellular network and a RAKE receiver implemented in UE 100, f may be the finger index of the RAKE receiver and $x_f$ may be the despread DPCH symbol from finger f.

The cell-specific weighting factor w(z) is thus used for a "second weighting". It may be computed by $$w(z) = \frac{Wd(z)}{Wc(z)} = \sqrt{\frac{Sd(z)}{Sc(z)}}, \qquad (2)$$

where Sd(z) is the cell-specific signal power of the dedicated data channel (e.g. DPCH), Sc(z) is the cell-specific signal power of the common pilot channel (e.g., CPICH), and Wd(z) and Wc(z) are the corresponding transmitter channel gains applied in the transmitter to the respective channels during power regulation.

Sc(z) may, e.g., be obtained from pilot power computation unit 104. Sd(z) is derived on the basis of the transmit power control data $Sd_s(z)$ as signaled by the network. $Sd_s(z)$ depends on the transmit signal power of the dedicated data channel of cell z. By way of example, $Sd_s(z)$ may be indicative of a change of the transmit signal power or may be indicative of the transmit signal power. $Sd_s(z)$ may be output by a dedicated control data extraction unit 107. Generally, Sd(z) may be obtained in various different ways on the basis of $Sd_s(z)$.

As depicted in FIG. 4, an output of the dedicated control data extraction unit 107 may be coupled to an input of the weight calculation unit 105. As mentioned above, the dedicated control data extraction unit 107 may be configured to extract the signaled transmit power control data $Sd_s(z)$. To that end, by way of example, an input of the dedicated control data extraction unit 107 may be coupled to an output of the combiner 106 to receive the corresponding information about $Sd_s(z)$ from combiner output y.

According to one exemplary implementation, if $Sd_s(z)$ is indicative of the transmit signal power of the dedicated data channel, the weight calculation unit 105 may directly use the signaled quantity $Sd_s(z)$ for $Sd(z)$, i.e., $Sd(z)=Sd_s(z)$. Of course, some intermediate data processing of $Sd_s(z)$ such as, e.g., filtering etc. may be applied.

Further $Sd(z)$, and correspondingly the weighting factor $w(z)$, may be calculated on the basis of $Sd_s(z)$ and other input quantities. By way of example, a data power computation unit 108 may be provided in UE 100. An input of the data power computation unit 108 may be coupled to an output of the data extraction unit 102 and an output of the data power computation unit 108 may be coupled to an input of the weight calculation unit 105. The data power computation unit 108 may be configured to compute a (measured) cell-specific signal power $Sd_m(z)$ of the dedicated data channel (e.g., DPCH). Measured $Sd_m(z)$ and signaled $Sd_s(z)$ may be used to compute $Sd(z)$ as used in equation (2) for computation of the cell-specific weighting factor $w(z)$.

Various kinds of signaled information $Sd_s(z)$ may depend on a transmit signal power of the dedicated data channel of cell z. Further, there are many possibilities to compute $Sd(z)$ on the basis of $Sd_m(z)$ and $Sd_s(z)$. By way of example, $Sd_s(z)$ may be an information that may only be transmitted in certain time intervals, e.g., every second. $Sd_s(z)$ may, e.g., be the average dedicated data channel downlink power during the last interval or the current dedicated data channel downlink power at the time of transmission.

$Sd_s(z)$ may be used in the weight calculation unit 105, e.g., as a re-initialization value or a correction factor or a bias value or a cross-check information. By way of example, if $Sd_s(z)$ is used as a re-initialization value, $Sd_s(z)$ may be taken for $Sd(z)$ once it is received, e.g., at the beginning of an interval, and the further values of $Sd(z)$ may then be calculated on the basis of $Sd_s(z)$ and the measurement values of $Sd_m(z)$, e.g., according to $$Sd(z,t)=Sd_s(z)+(Sd_m(z,t)-Sd_m(z,t_0)) \quad (3)$$

where t is the time and $t_0$ is the time of re-initialization, e.g., at the beginning of the interval.

Further, if $Sd_s(z)$ is used to calculate a correction factor, the correction factor may be used to scale $Sd_m(z)$ by a quantity proportional to, e.g., the ratio $Sd_s(z)/Sd_m(z)$. Further, a bias may calculated on the basis of a deviation $Sd_m(z)-Sd_s(z)$ between the signaled and the measured dedicated data channel downlink powers, possibly scaled by an appropriate deviation scaling factor and then added to $Sd_m(z)$ to derive $Sd(z)$. Still further, $Sd_s(z)$ could be used as a cross-check information to correct the measured power value $Sd_m(z)$ if a deviation between the signaled and the measured dedicated data channel downlink powers is considered to be too large. By way of example, $Sd_s(z)$ could be compared with $Sd_m(z)$ by $$|Sd_s(z)-Sd_m(z)| \geq S_{Thresh} \quad (4)$$

to check whether the difference between the signaled and measured values is greater than a threshold value $S_{Thresh}$. Each time equation (4) is fulfilled, $Sd_m(z)$ may be corrected by a given power step $S_{step}$ in the direction of the signaled value $Sd_s(z)$. By way of example, $Sd_m(z)$ may be corrected by, e.g., +1 dB if $Sd_s(z)$ is, e.g., 2 dB greater than $Sd_m(z)$ and $Sd_m(z)$ may corrected by, e.g., −1 dB if $Sd_s(z)$ is more than, e.g., 2 dB less than $Sd_m(z)$, whereas in this example, $S_{Thresh}=2$ dB and $S_{Step}=1$ dB.

Further, according to other possibilities, the control data $Sd_s(z)$ may indicate that the transmit signal power of the dedicated data channel of cell z has been changed, e.g., reduced or increased at the transmitter. $Sd_s(z)$ indicative of a transmit signal power change could be transmitted in an event-driven manner or, as already mentioned, regularly in certain intervals. $Sd_s(z)$ indicative of a transmit signal power change may also be extracted in the dedicated control data extraction unit 107. By way of example, it may be used to trigger or sample a new dedicated data channel power measurement in the data power computation unit 108. The newly measured value of $Sd_m(z)$, possibly averaged, may then be used as a new value for $Sd(z)$ in equation (2).

The above-mentioned examples of using $Sd_s(z)$ either exclusively or in combination with $Sd_m(z)$ to calculate $Sd(z)$ for use in equation (2) may be combined with each other. That is, the type of information of $Sd_s(z)$ (e.g., instantaneous transmit power value, average transmit power value, information about transmit power change in the transmitter), the transmission timing of $Sd_s(z)$ (e.g., regularly or event-driven), and the way $Sd_s(z)$ is combined with $Sd_m(z)$ for deriving $Sd(z)$ in equation (2) (e.g., by re-initialization, scaling, bias correction or cross-check, etc.) may be appropriately combined for various specific implementations.

Figure 5:
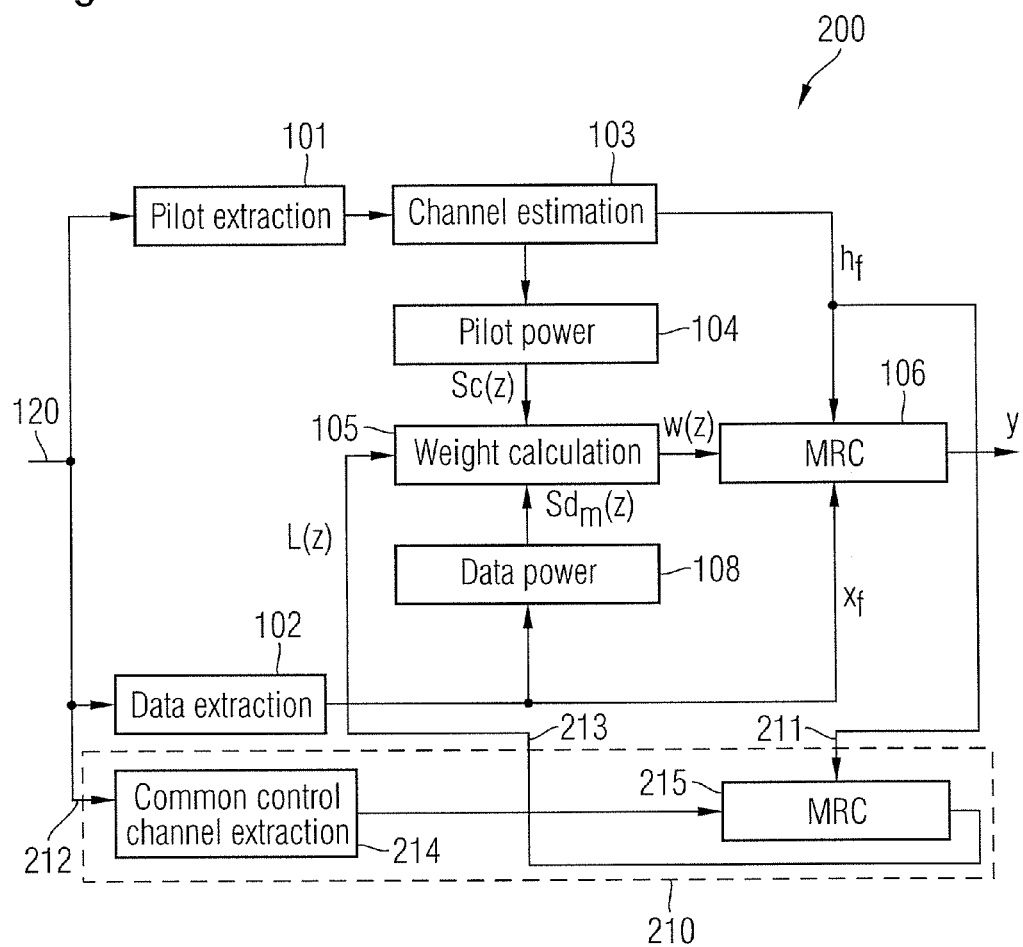
FIG. 5 is a schematic block diagram of an exemplary implementation of a radio receiver apparatus.

In FIG. 5, a UE 200 is illustrated in which weight calculation in weight calculation unit 105 is accomplished on the basis of a cell load indicator $L(z)$ indicative of a cell load of cell z.

Briefly, concerning the input 120, the pilot extraction unit 101, the data extraction unit 102, the channel estimation unit 103, the pilot power computation unit 104, the weight calculation unit 105, the combiner 106 and data power computation unit 108, the UE 200 may be implemented similarly to UE 100, and reference is made to the above description to avoid reiteration. Further, UE 200 may comprise a cell load indicator generation structure 210. The cell load indicator generation structure 210 generates the cell load indicator $L(z)$. The block diagram of UE 200 may be applicable to all receiver types, e.g., RAKE receiver, MIMO receiver, OFDM receiver, e.g., for LTE, etc.

By way of example, the cell load indicator generation structure 210 may have a first input 211 coupled to an output of the channel estimation unit 103, a second input 212 coupled to the input 120 and an output 212 providing the cell load indicator $L(z)$. By way of example, the cell load indicator generation structure 210 may comprise a common control channel extraction unit 214 which may be coupled to the input 120, and a combiner 215 which may be coupled to an output of the common control channel extraction unit 214. Channel estimates may be provided via first input 211 to the combiner 215.

During operation the common control channel extraction unit 212 extracts samples associated with a common control channel and transmitting information indicative of a cell load for each cell z. These samples are then combined or equalized in the combiner 215, which may be a MRC. At an output of the combiner 215 the cell load indicator $L(z)$ may be provided.

It is to be noted that the cell load indicator $L(z)$ is basically a cell-specific quantity. The cell load indicator $L(z)$ may also be indicative of a group of cells z. That is, some of the cells under consideration, e.g., cells established by antenna sectors of the same base station, may have the same cell load indicator $L(z)$. However, typically cells associated with different base stations do have different cell load indicators $L(z)$.

If one cell z of the active set is indicated as full or nearly full, but another not, the UE 200 would expect the dedicated downlink data channel contribution of the not-full cell is higher than the one of the full or nearly full cell, see FIG. 1.

The weight calculation in weight calculation unit 105 may then be biased or corrected on the basis of the cell load indicator L(z).

By way of example, Sd(z) as used in equation (2) could be a function f of measured $Sd_m(z)$ and the cell load indicator L(z) as signaled by the network, i.e., $$Sd(z)=f(Sd_m(z),L(z)) \quad (5)$$

That way, the cell load indicator L(z) could be used to adjust the weighting factor w(z) computed in the weight calculation unit 105 according to equation (2). For example, L(z) may be binary, e.g., L(z)=1 if cell z is indicated to be full and L(z)=0 if cell z is indicated to be empty. In this case, by way of example, Sd(z) may be given by $$Sd(z)=Sd_m(z)-(2L(z)-1)S_{Step} \quad (6)$$

where $S_{Step}$ is a predetermined constant, e.g., may be 1 dB. In this case, Sd(z) is reduced by $S_{Step}$ if the cell is full and is increased by $S_{Step}$ if the cell is empty. Of course, other functional relationships could be used for f, and the cell load indicator may have a bit width of more than one, e.g., two, three, four, etc, for providing a cell load indicator L(z) of finer granularity.

Figure 6:
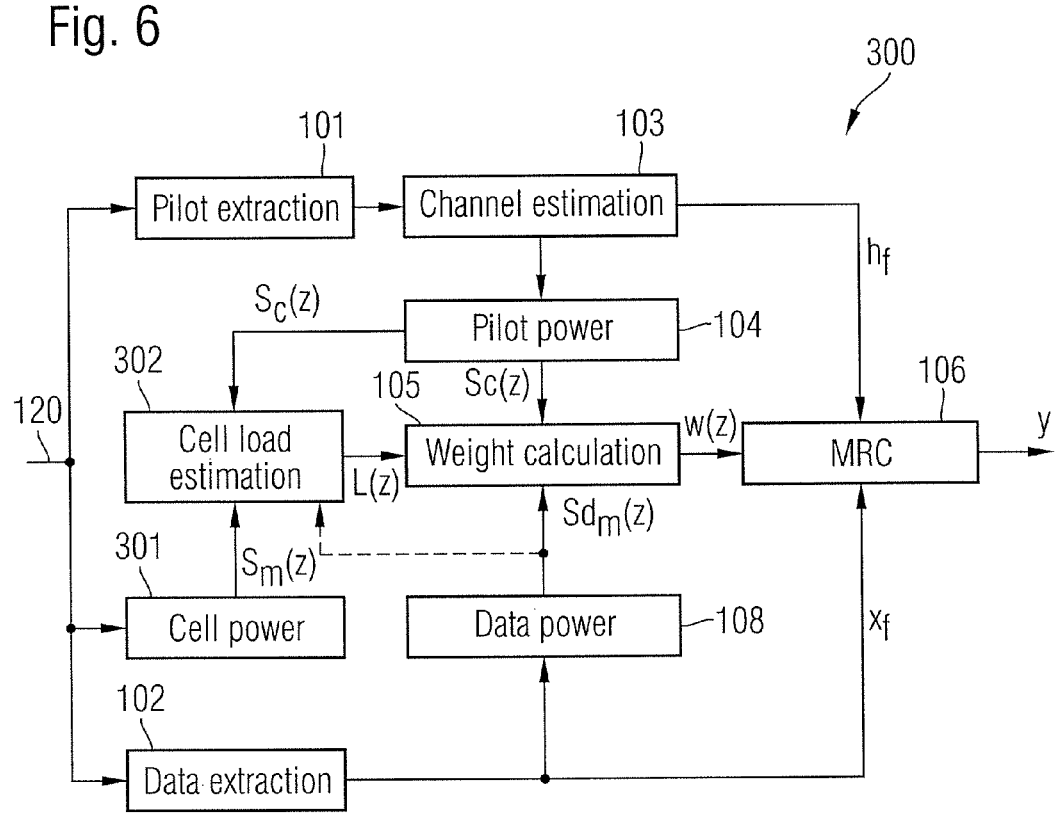
FIG. 6 is a schematic block diagram of an exemplary implementation of a radio receiver apparatus.

According to FIG. 6, an exemplary UE 300 may comprise the input 120, the pilot extraction unit 101, the data extraction unit 102, the channel estimation unit 103, the pilot power computation unit 104, the weight calculation unit 105, the combiner 106 and the data power computation unit 108 as described above. Further, UE 300 may comprise a cell power computation unit 301 and a cell load estimation unit 302. The block diagram of UE 300 may be applicable to all receiver types, e.g. RAKE receiver, MIMO receiver, OFDM receiver, e.g. for LTE, etc.

Operation of UE 300 is similar to operation of UE 200, with the exception that in UE 300 the cell load indicator L(z) is estimated on the basis of power measurements rather than on the basis of signaled information from the network. More specifically, in cell power computation unit 301 the total cell power per cell z of the active set may be measured. By way of example, considering a UMTS network, the total cell power may be measured on the basis of the descrambled signal for all UEs served by the cell.

The measured total cell power $S_m(z)$ may be fed into the cell load estimation unit 302. The cell load indicator L(z) is estimated on the basis of $S_m(z)$ and Sc(z). By way of example, L(z) may be determined on the basis of a quantity $S_m(z)/(B \cdot Sc(z))$, where B is a known constant indicative of the ratio of the maximum total cell power (i.e., the maximum power budget, see FIG. 1) of a cell and the power of the common pilot channel, e.g. CPICH, which is independent of the actual cell load. Thus, as B may be constant throughout the network and/or may be known at each UE 300, the actual cell load may be computed at UE 300 on the basis of Sc(z) and $S_m(z)$. Then, the cell load indicator L(z) may be quantized from the above-specified ratio or another suitable expression in a straight forward manner, e.g., as a binary or multi-bit width quantity.

Figure 7:
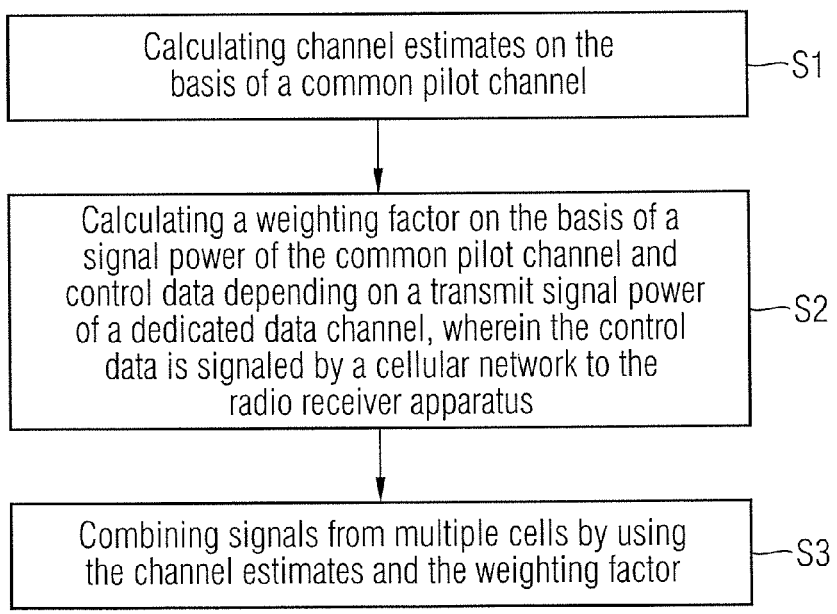
FIG. 7 is a flow chart illustrating an exemplary method of processing data in a radio receiver apparatus of a cellular network.

FIG. 7 illustrates one exemplary method. In step S1 channel estimates are calculated on the basis of a common pilot channel.

Then a weighting factor is calculated on the basis of a signal power of the common pilot channel and transmit power control data depending on a transmit signal power of a dedicated data channel, wherein the transmit power control data is signaled by a cellular network to the radio receiver apparatus at step S2.

In step S3 signals from multiple cells are then combined using the channel estimates and the weighting factor.

Figure 8:
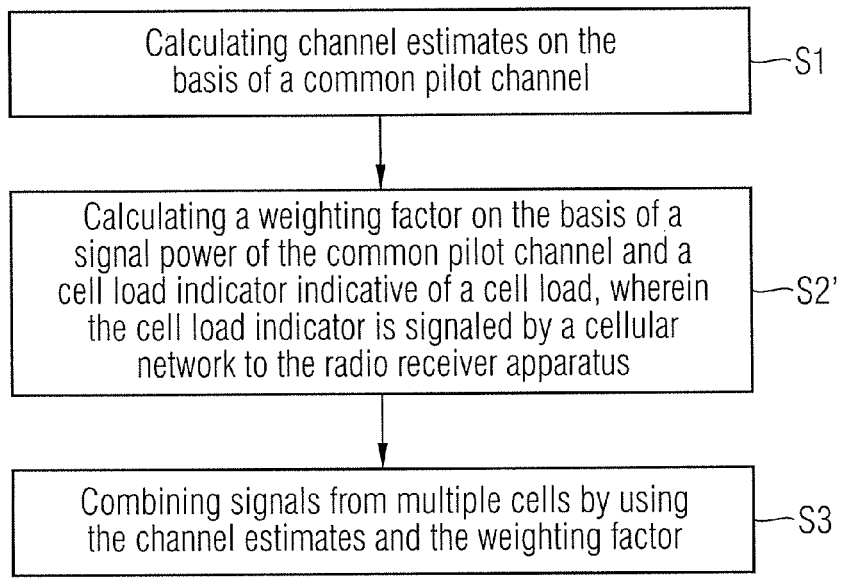
FIG. 8 is a flow chart illustrating an exemplary method of processing data in a radio receiver apparatus of a cellular network.

According to another example as illustrated in FIG. 8, channel estimates are calculated on the basis of a common pilot channel at step S1.

Then, a weighting factor is calculated on the basis of a signal power of the common pilot channel and a cell load indicator indicative of a cell load, wherein the cell load indicator is signaled by the cellular network of the radio receiver apparatus at step S2'.

Then, according to step S3, signals from multiple cells are combined using the channel estimates and the weighting factor.

Figure 9:
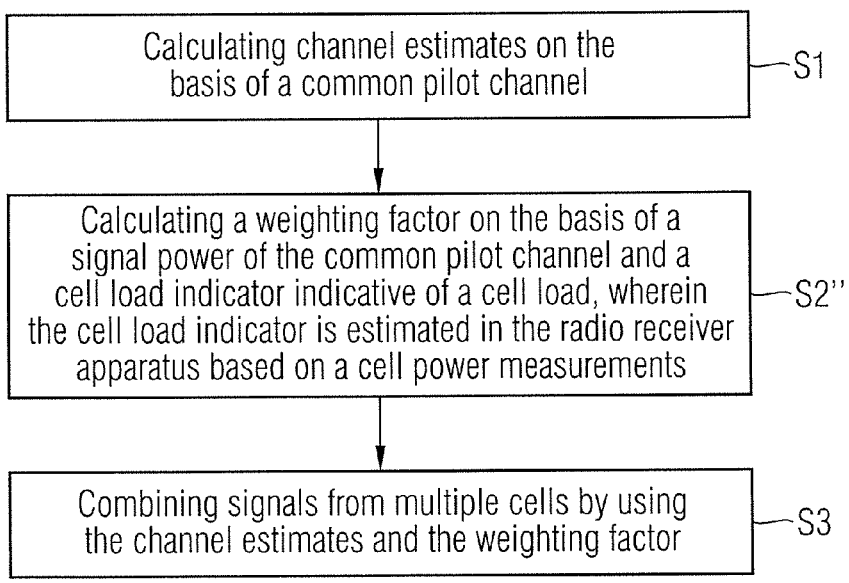
FIG. 9 is a flow chart illustrating an exemplary method of processing data in a radio receiver apparatus of a cellular network.

According to FIG. 9, in step S1 channel estimates are calculated on the basis of a common pilot channel.

Then, a weighting factor is calculated on the basis of a signal power of the common pilot channel and a cell load indicator indicative of a cell load, wherein the cell load indicator is estimated in the radio receiver apparatus based on a cell power measurement, see step S2".

Then, according to step S3, signals from multiple cells are combined by using the channel estimates and the weighting factor.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of embodiments described herein. Therefore, it is intended that this invention is limited only by the claims and the equivalents thereof.

What is claimed is:

1. A radio receiver apparatus of a cellular network, comprising:
    a channel estimator configured to calculate channel estimates on the basis of a common pilot channel;
    a weight calculation unit configured to calculate a weighting factor on the basis of a signal power of the common pilot channel and control data indicative of a transmit signal power of a dedicated data channel, wherein the control data is signaled by the cellular network to the radio receiver apparatus; and
    a combiner configured to combine signals from multiple cells by using the channel estimates and the weighting factor.

2. The radio receiver apparatus of claim 1, wherein the cellular network allocates one or more cells to a connection of the radio receiver apparatus, wherein the weighting factor is cell-specific.

3. The radio receiver apparatus of claim 2, wherein the control data is cell-specific.

4. The radio receiver apparatus of claim 1, further comprising:
    a control data extraction unit having an input coupled to an output of the combiner and having an output coupled to an input of the weight calculation unit.

5. The radio receiver apparatus of claim 1, further comprising:
    a first signal power measurement unit configured to output a first power quantity indicative of the signal power of the common pilot channel to the weight calculation unit.

6. The radio receiver apparatus of claim 1, further comprising:
    a second signal power measurement unit configured to output a second power quantity indicative of a signal power of the dedicated data channel to the weight calculation unit.

7. The radio receiver apparatus of claim 6, wherein the weight calculation unit is configured to calculate the weighting factor on the basis of the signal power of the common pilot channel, the second power quantity and the control data.

8. The radio receiver apparatus of claim 7, wherein the weight calculation unit is configured to modify the second power quantity on the basis of the control data.

9. The radio receiver apparatus of claim 8, wherein the second power quantity is modified by applying a bias based on the control data or a correction factor based on the control data to the second power quantity.

10. A method of processing data in a radio receiver apparatus, comprising:
- calculating channel estimates on the basis of a common pilot channel;
- calculating a weighting factor on the basis of a signal power of the common pilot channel and control data indicative of a transmit signal power of a dedicated data channel, wherein the control data is signaled by a cellular network to the radio receiver apparatus; and
- combining signals from multiple cells by using the channel estimates and the weighting factor.

11. The method of claim 10, further comprising:
- measuring the signal power of the common pilot channel to generate a first power quantity indicative of the signal power of the common pilot channel, and
- using the first power quantity to calculate the weighting factor.

12. The method of claim 10, further comprising:
- measuring the signal power of the dedicated data channel to generate a second power quantity indicative of the transmit signal power of the dedicated data channel.

13. The method of claim 12, wherein calculating the weighting factor further comprises:
- calculating the weighting factor on the basis of the signal power of the common pilot channel, the second power quantity and the control data.

14. The radio receiver apparatus of claim 1,
- wherein the combiner is configured to multiply the channel estimates by the weighting factor, and
- wherein the weighting factor comprises a ratio of the signal power of the common pilot channel and the transmit signal power of the dedicated data channel.

* * * * *